United States Patent
Reynard

(10) Patent No.: US 6,679,660 B2
(45) Date of Patent: Jan. 20, 2004

(54) SELF-CLEANING ROTATABLE CLAMPING DEVICE

(76) Inventor: Kenneth Reynard, C/o Duraloc Limited, Unit 7, Carlton Miniott Business Park, Carlton Road, Thirsk (GB), YO7 4NF (*) Notice: Subject to any disclaimer, the term of this patent is extended or adjusted under 35 U.S.C. 154(b) by 0 days.

(21) Appl. No.: 10/242,292

(22) Filed: Sep. 12, 2002

(65) Prior Publication Data

US 2003/0053878 A1 Mar. 20, 2003

(30) Foreign Application Priority Data

Sep. 14, 2001 (GB) .............................................. 0122181

(51) Int. Cl.$^7$ ................................................. B60P 7/08
(52) U.S. Cl. ......................................... 410/82; 410/76
(58) Field of Search ............................ 410/82, 83, 73, 410/76; 248/500, 503, 681

(56) References Cited

U.S. PATENT DOCUMENTS

| | | | |
|---|---|---|---|
| 3,593,387 A | | 7/1971 | Georgi |
| 3,724,796 A | | 4/1973 | Hawkins et al. |
| 4,419,034 A | * | 12/1983 | DiMartino .................... 410/83 |
| 4,697,967 A | * | 10/1987 | Schulz et al. ................. 410/82 |
| 4,776,736 A | * | 10/1988 | Tatina .......................... 410/83 |
| 5,765,977 A | * | 6/1998 | Reynard ....................... 410/82 |
| 5,893,692 A | * | 4/1999 | Asanuma ..................... 410/83 |
| 5,927,916 A | * | 7/1999 | Kroll et al. ................... 410/83 |

FOREIGN PATENT DOCUMENTS

| | | |
|---|---|---|
| EP | 66722 | 12/1982 |
| GB | 2303401 | 2/1997 |

* cited by examiner

Primary Examiner—Stephen T. Gordon
(74) Attorney, Agent, or Firm—Madson & Metcalf

(57) ABSTRACT

A rotatable clamping device (10) which can clamp a corner fitting of a freight container to an underlying support includes: a main housing (11) which defines an upright cylindrical passage (12) in which an actuator shaft (13) is rotatably mounted; a clamping head (14) secured to an upper end of the actuator shaft (13) and rotatable with the shaft between a release position and a clamping position with respect to a corresponding corner fitting; an actuator (15) coupled with the shaft (13) and operative to rotate the clamping head (14) at least from the clamping position to the release position; and a detent arrangement (16) acting between the outer surface of the shaft (13) and the inner wall surface of the cylindrical passage and operative to define a detent position and permit location of the shaft in at least one predetermined angular setting relative to the passage which corresponds to at least one of the release and clamping positions of the head: in which the detent arrangement comprises at least one recess (20) formed in one surface of the shaft surface and the inner wall surface, and a resiliently biassed element (19) pressed towards one surface and engageable in recess upon rotation of the shaft to the predetermined angular setting; and a downwardly extending slot (21) is formed in the one surface and communicates with the recess (20) in order to provide gravity discharge of dirt/debris collected in the annular space between the outer surface of the shaft and the inner wall surface of the passage.

7 Claims, 2 Drawing Sheets

SELF-CLEANING ROTATABLE CLAMPING DEVICE

This invention relates to a self-cleaning rotatable clamping device of the type used to clamp or hold-down a freight container to an underlying support platform, or a further container in order to form a stack of containers.

It is well known to use so-called "twistlok heads" in clamping devices for freight containers, in which the corners (and optionally at other locations) of the container are provided with so-called "corner fittings", and which are robust cast housings secured to the container structure and having a hollow interior which receives a clamping head of an underlying clamping device via an entrance opening in the housing.

In the case of spring loaded clamping heads, the head is normally spring-biassed to a clamping position, but is movable through approximately 90° against the spring biassing by inter-engagement between the corner fitting and the head as the container is lowered into position, whereby the head is able to pass through the entrance opening and into the interior of the corner fitting. After the head is received within the corner fitting, it is then free to rotate under the spring biassing in order to resume its clamping position in which it holds down or clamps the corner fitting to the clamping device.

In more simple designs of freight container clamping device, the head is manually rotated between the clamping position and a release position (permitting movement of the head into or out of the housing depending upon whether loading or unloading of the container is taking place).

A clamping device for a freight container usually comprises a main housing, a vertical actuator shaft rotatably mounted in the housing, a twistlok or other clamping head secured to the upper end of the shaft, and usually a manually operated lever connected to the lower end of the shaft. In the case of a spring loaded head, the lever is operated only to move the head to a release position prior to unloading of a container, but for a non- spring loaded head the lever may be operated to adjust the head between the clamping and release positions during loading and unloading.

Regardless of the type of clamping device used, it is usual to provide a spring loaded detend which has the function of lightly maintaining the shaft in any one or more predetermined angular setting (corresponding to the clamping and/or the release of the head), and the detent may take the form of a compression spring which is housed in a diametrically extending slot formed in the shaft, and a pair of detent balls arranged one at each end of the spring and biassed outwardly into engagement with the cylindrical wall of the passage formed in the housing to receive the shaft.

Circumferentially spaced indentations (or, recesses) are formed in the cylindrical wall at angular locations corresponding to the required detent positions of the head, and when the shaft is actuated to move the head between its release and clamping positions, the balls roll and/or slide along a circular path of contact with the cylindrical wall until they come into registry with the indentations and are then spring-pressed into light holding or detent positions in the indentations.

The detent positions are not intended to lock the head in position, but to provide a light holding action for a temporary period when required.

In known arrangements, the actuator shaft has smooth slidable engagement with the cylindrical wall of the passage, but inevitably over a period of time there is ingress of dirt and grit into the annular space defined between the outer surface of the shaft and the inner surface of the cylindrical wall. In addition, repeated actuation of the shaft (and of the detent arrangement) will, over a period of time, generate wear in the engaging surfaces and which will form metal dust which remains trapped in the same annular space.

This build-up of material in the annular space increases the resistance to actuating movement of the shaft (and which may eventually become jammed in position) and also further increases the wearing action.

The invention therefore seeks, by simple means, to provide a self-cleaning effect, by enabling any dirt and other debris which is created in the region of the interface between the shaft and the cylindrical wall to be discharged during use of the clamping device.

According to the invention there is provided a rotatable clamping device of the type used to clamp a corner fitting of a freight container to an underlying support, and comprising:

a main housing defining an upright cylindrical passage in which an actuator shaft is rotatably mounted;

a clamping head secured to an upper end of the actuator shaft and rotatable with the shaft between a release position and a clamping position with respect to a corresponding corner fitting;

actuator means coupled with the shaft and operative to rotate the clamping head at least from the clamping position to the release position; and a detent arrangement acting between the outer surface of the shaft and the inner wall surface of the cylindrical passage and operative to define a detent position and permit location of the shaft in at least one predetermined angular setting relative to the passage which corresponds to at least one of the release and clamping positions of the clamping head;

in which:

the detent arrangement comprises at least one recess formed in one surface of said shaft surface and said inner wall surface, and a resiliently biassed element pressed towards said one surface and engageable in said recess upon rotation of the shaft to said predetermined angular setting; and a downwardly extending slot is formed in said one surface and communicates with said recess in order to form a means of gravity discharge of dirt/debris collected in the annular space between the outer surface of the shaft and the inner wall surface of said passage.

Therefore, in a clamping device of the invention, a detent arrangement is provided whose normal purpose is to define and then locate the shaft in the predetermined angular setting, but which also provides a self-cleaning function during actuation of the shaft, in that any dust, dirt, swarf etc. generated and/or collected in the annular space between the outer surface of the shaft and the inner wall surface of the passage can be discharged via the discharge slot.

This improves the working life of the clamping device, and eases the actuation of the shaft.

Preferably, the recess is formed in the inner wall surface of the passage, and the resiliently biassed element is housed in the shaft.

The resiliently biassed element may comprise a compression spring housed in a diametral slot extending through the shaft, and a ball and/or slidable element arranged at one end of the shaft and urged radially outwardly into contact with the passage wall. Then, upon rotation of the shaft, the ball or slidable element moves over the inner wall surface of the passage, and cleans it, as it moves into engagement with the recess.

If required, balls may be arranged one at each end of the compression spring.

The actuating means may comprise a simple actuator lever or handle, and which is operated in order to move the clamping head from the clamping position to the release position, in order to permit release of the clamping device from a corner fitting.

In a semi-automatic clamping device, a biassing spring, or other biassing means, may be provided in order to urge the clamping head to take up the clamping position, and therefore to restore the clamping head to the clamping position after entry of the clamping head into the corner fitting.

A preferred embodiment of the invention will now be described in detail, by way example only, with reference to the accompanying drawings, in which.

Figure 1:
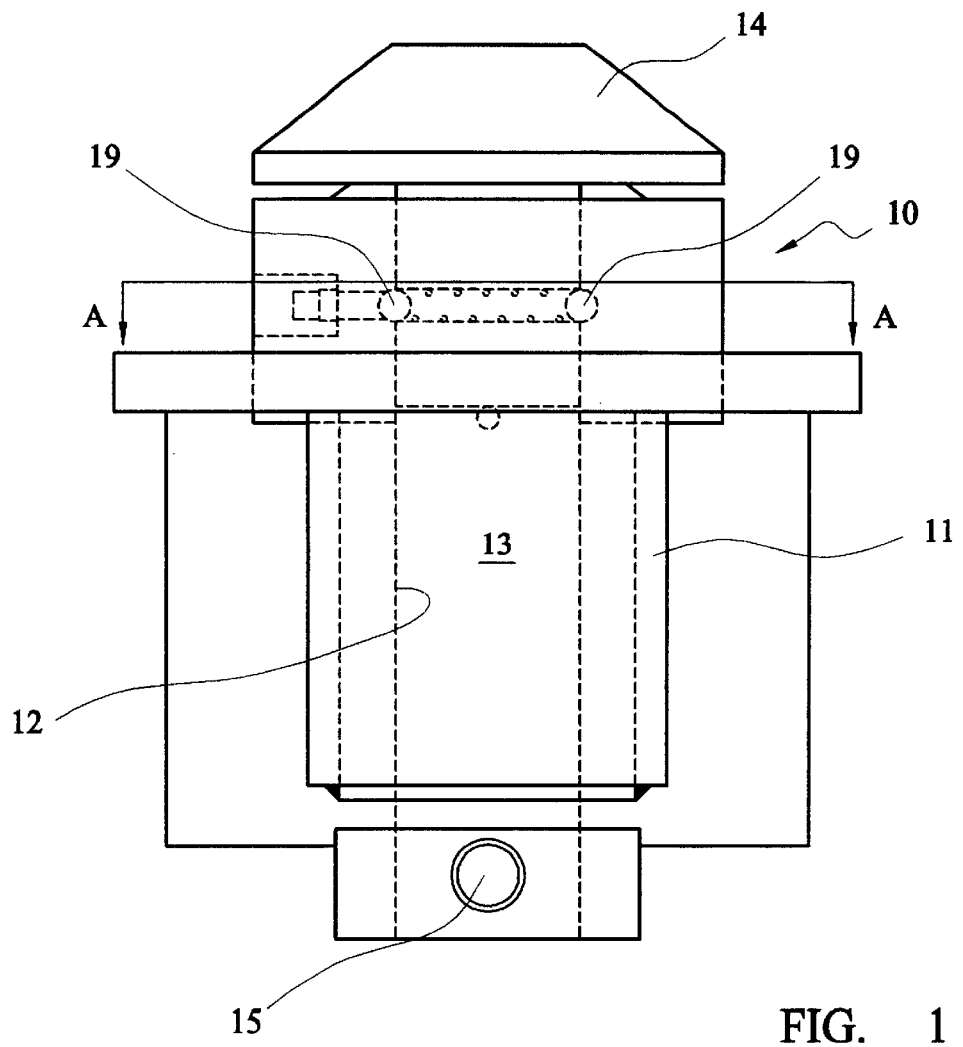
FIG. 1 is a side view of a freight container clamping device according to the invention.

Referring now to the drawings, a rotatable clamping device according to the invention is designated generally by reference 10, and is of the type used to clamp a corner fitting (not shown) of a freight container to an underlying support, such as a load platform of a lorry or railway wagon.

The device 10 comprises a main housing 11 which defines an upright cylindrical passage 12 in which an actuator shaft 13 is rotatably mounted. A clamping head. 14, which may be a twistlok head, is secured to an upper end of the shaft 13, and is rotatable with the shaft between a release position and a clamping position with respect to a corresponding corner fitting. The cooperation between a clamping head and a corner fitting will be well known to those of ordinary skill in the art, and need not be described in more detail, or illustrated herein.

Actuator means is provided, coupled with the shaft 13, and in the present embodiment takes the form of an operating lever or handle 15. This is operative to rotate the clamping head 14 at least from the clamping position to the release position, in order to permit release of the clamping head from corner fitting, upon unloading of a container from the support platform.

A detent arrangement 16 is provided, which acts between the outer surface of the shaft 13 and the inner wall surface of the cylindrical passage 12, and is operative to define and to locate the shaft in at least one predetermined angular setting relative to the passage 12, and which corresponds to at least one of the release and clamping positions of the clamping head 14.

The detent arrangement 16 comprises at least one recess formed in one surface (one surface of the outer surface of the shaft or the inner wall surface of the passage), and a resiliently biassed element pressed towards one said surface and engageable in the recess upon rotation of the shaft.

In the illustrated embodiment, the detent arrangement 16 comprises a compression spring 17 housed in a diametrically extending slot 18 formed in the shaft 13. A pair of detent balls 19 is provided, arranged one at each end of the spring 17 and biassed radially outwardly into engagement with the cylindrical wall of the passage 12.

Figure 2:
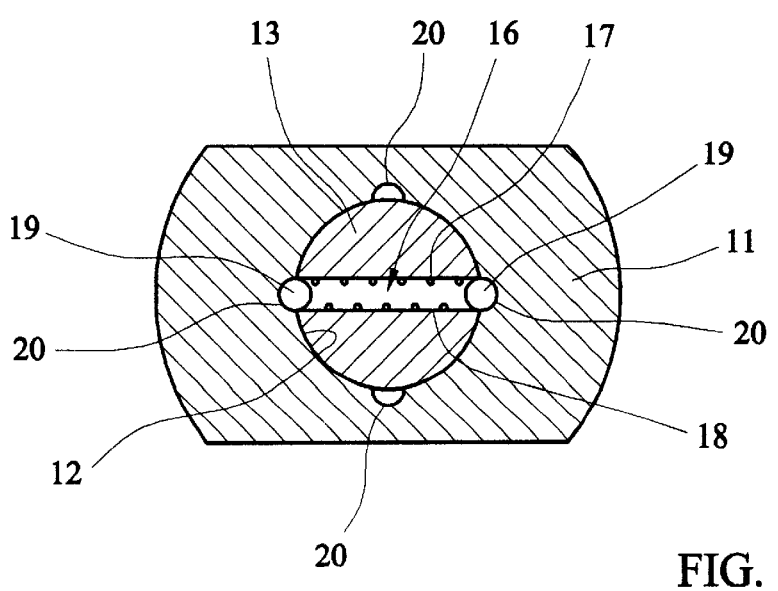
FIG. 2 is a section taken on Section line AA in FIG. 1.
Figure 3:
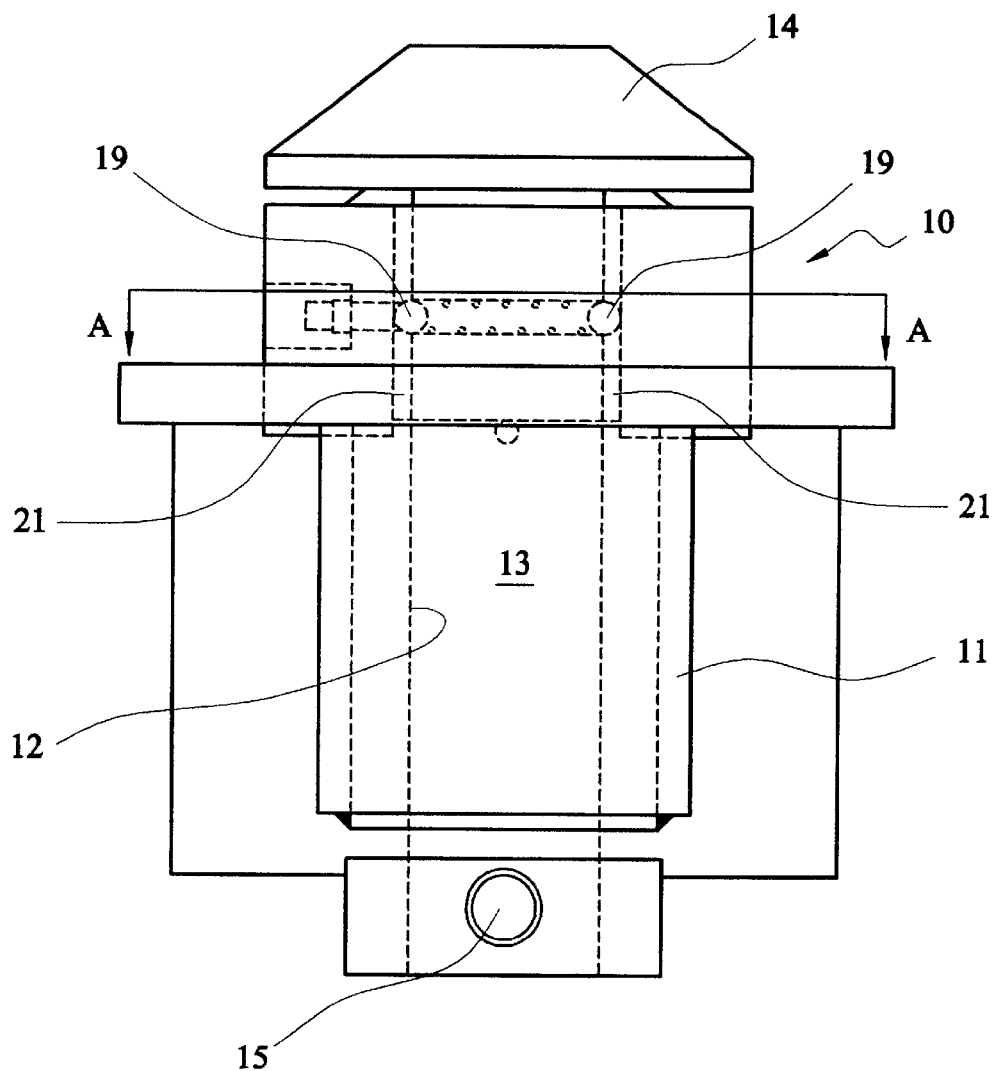
FIG. 3 is a further side view, similar to FIG. 1, showing more internal detail of the clamping device.
Figure 4:
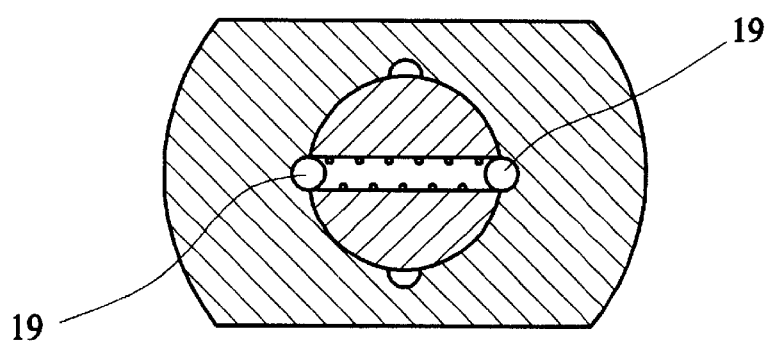
FIG. 4 is a section taken on Section line AA in FIG. 3.

Circumferentially spaced recesses 20 are formed in the inner wall surface of the passage 12, and as shown in FIG. 2, four recesses 20 are provided. This detent arrangement therefore provides two predetermined angular settings for the shaft 13, and corresponding to the clamping and the release positions of the clamping head 14.

At least one downwardly extending slot 21 is formed in said one surface (in the illustrated embodiment the inner wall surface of passage 12) and which communicates with recess 20 in order to form a means of gravity discharge of any dirt/debris collected in the annular space between the outer surface of the shaft 13 and the inner wall surface of the passage 12. The rotation of the shaft causes the balls 19 to sweep over and wipe the surface which it contacts, and therefore exerts a cleaning action during each actuation of the shaft 13.

Therefore, the detent arrangement 16 provided herein has a normal purpose of defining and then locating the shaft in a predetermined angular setting, but also provides a self cleaning function during actuation of the shaft, in that any dust, dirt, swarf etc. generated and/or collected in the annular space can be discharged via the discharge slot.

In the illustrated embodiment, the resiliently biassed elements 19 are housed in the shaft 13, and the recesses 20 are formed in the inner wall surface of the passage 12. It is, however, within the scope of the invention for these components to be reversed, whereby a radially inwardly directed ball or slidable element is housed in the inner wall of the passage 12, and spring pressed towards engagement with the outer surface of the shaft 13, and capable of engaging one or more recess in the outer surface of the shaft 13, again to define the predetermined angular settings of the shaft.

The actuating handle 15 may be used solely to move the clamping head 14 from the clamping position to the release position, and which will usually take place upon disengagement of a corner fitting from the clamping device. If a spring loaded clamping head arrangement is provided, the spring loading normally urges the clamping head to take up the clamping position, but the clamping head can be rotated against the spring loading as it engages the underside of the corner fitting during loading of a container onto a platform.

In an embodiment in which there is no spring loading, the actuator handle 15 may be used to move the clamping head from the clamping position to the release position, and also from the release position to the clamping position.

What is claimed is:

1. A rotatable clamping device of the type used to clamp a corner fitting of a freight container to an underlying support, and comprising:

a main housing defining an upright cylindrical passage in which an actuator shaft is rotatably mounted;

a clamping head secured to an upper end of the actuator shaft, and rotatable with the shaft between a release position and a clamping position with respect to a corresponding corner fitting;

actuator means coupled with the shaft and operative to rotate the clamping head at least from the clamping position to the release position; and a detent arrangement acting between the outer surface of the shaft and an inner wall surface of the cylindrical passage and operative to define a detent position and permit location of the shaft in at least one predetermined angular setting relative to the passage which corresponds to at least one of the release and clamping positions of the clamping head;

in which:

the detent arrangement comprises at least one recess formed in one surface of said shaft surface and said inner wall surface, and a resiliently biassed element pressed towards said one surface and engageable in said recess upon rotation of the shaft to said predetermined angular setting; and a downwardly extending slot is formed in said one surface and communicates with said recess in order to form a means of gravity discharge of dirt/debris collected in an annular space between the outer surface of the shaft and the inner wall surface of said passage.

2. A rotatable clamping device according to claim 1, in which the recess is formed in the inner wall surface of the passage, and the resiliently biassed element is housed in the shaft.

3. A rotatable clamping device according to claim 2, in which the resiliently biassed element comprises a compression spring housed in a diametral slot extending through the shaft, and a slidable element arranged at one end of the shaft and urged radially outwardly into contact with the passage wall.

4. A rotatable clamping device according to claim 3, wherein the slidable element comprises a first ball.

5. A rotatable clamping device according to claim 1, in which the actuating means comprises an actuator lever or handle, and which is operable in order to move the clamping head from the clamping position to the release position, in order to permit release of the clamping device from a corner fitting.

6. A rotatable clamping device according to claim 1, and comprising a semi-automatic clamping device, in which biasing means is provided to urge the clamping head to take up the clamping position, and therefore to restore the clamping head to the clamping position after entry of the clamping head into the corner fitting.

7. A rotatable clamping device according to claim 4, comprising a second ball in which the first and second balls are arranged one at each end of the compression spring.

* * * * *

UNITED STATES PATENT AND TRADEMARK OFFICE
CERTIFICATE OF CORRECTION

PATENT NO. : 6,679,660 B2
DATED : January 20, 2004
INVENTOR(S) : Kenneth Reynard It is certified that error appears in the above-identified patent and that said Letters Patent is hereby corrected as shown below:

Column 1,
Line 43, please delete "detend" and replace with -- detent --.

Signed and Sealed this

Twenty-first Day of June, 2005

JON W. DUDAS
*Director of the United States Patent and Trademark Office*